ated Aug. 1971.

United States Patent [19]
Winn

[11] 4,378,953
[45] Apr. 5, 1983

[54] THIN, OPTICAL MEMBRANES AND METHODS AND APPARATUS FOR MAKING THEM

[75] Inventor: Ray Winn, Studio City, Calif.

[73] Assignee: Advanced Semiconductor Products, Santa Cruz, Calif.

[21] Appl. No.: 326,489

[22] Filed: Dec. 2, 1981

[51] Int. Cl.³ .............................................. G02B 27/14
[52] U.S. Cl. ...................................... 350/171; 350/1.1
[58] Field of Search ................ 350/1.1, 169, 171, 172, 350/173, 174, 61

[56] References Cited

U.S. PATENT DOCUMENTS 2,907,672 10/1969 Irland et al. ......................... 350/171
3,438,694 4/1969 Reid et al. ........................... 350/171
3,811,753 5/1974 Onoki et al. ......................... 350/409

OTHER PUBLICATIONS

National Photocolor Corp., "NPC Pellicle Coatings and Curves", NPC, 53 Water St., South Norwalk Conn 06854, dated 3/3/1970.
Union Carbide, "Parylene Pellicles", Union Carbide Corp., New Business Development Dept., 270 Park Ave., N.Y., N.Y., 10017 dated Aug. 1971.

Primary Examiner—Bruce Y. Arnold
Attorney, Agent, or Firm—Kendrick, Netter & Bennett

[57] ABSTRACT

Edge-supported and fully supported membranes having substantially uniform thickness, and substantially parallel surfaces, and having the capacity to transmit at least about 90% of incident light with very little diffraction, dispersion or absorption of incident light are made by forming a polymer/solvent mixture, spin-coating a film of the polymer from the mixture onto a rotatable surface, which may have a release agent thereon, and, where a release agent is present, joining a frame or other support to the membrane and removing the membrane with its attached support from the surface. Apparatus for making such membranes includes a dispenser for dispensing a polymer/solvent mixture onto a rotatable support; a device for spinning the rotatable support at gradually increasing speeds from a first to a second speed; and a device for maintaining the speed of rotation of the support at the second speed until the membrane forms.

37 Claims, 1 Drawing Figure

THIN, OPTICAL MEMBRANES AND METHODS AND APPARATUS FOR MAKING THEM

This invention relates to thin, optical membranes and to methods and apparatus for making such membranes.

The thin, optical membranes of this invention have substantially uniform optical thickness. Specifically, they can have a nominal optical thickness in the range of about 0.5 to about 10 micrometers. The opposite surfaces of these membranes are nearly parallel to one another. Unit-to-unit variations in nominal thickness can be limited to less than about 2%, and preferably less than about 1%. In any one membrane, variations in nominal thickness from edge to edge of the membrane can be limited to less than about 2%, and preferably less than about 1%.

These membranes are highly light-transmissive. Specifically, these membranes transmit in the range of about 84% to about 99% of incident light and can be made to transmit at least about 96%, 98% or even 99% of incident light at one or more predetermined wavelengths of light in the range of about 260 to about 1,000 nanometers. Yet, these membranes can be made to shift the focus of incident light in an optical path less than about a third of the membrane's thickness. Because the membranes are highly light-transmissive, they absorb, diffract and disperse less than about 3% of incident light, and can be made to absorb, diffract and disperse less than about 1% of incident light at one or more specific wavelengths in the range of about 260 to about 1,000 nanometers (nm).

These new membranes have many uses. In particular, they are useful as optically transmissive shields for reticles in projectors such as the Perkin-Elmer 200 series projectors. Placing these new films over photomasks, for example, protects the masks from airborne particulates and other forms of contamination. These membranes are available commercially from Advanced Semiconductor Products under the tradenames Broadband Photomask Pellicle Type BB-2.85 and Low Reflectance Monochromatic Pellicle Type LR-1.

The Type BB-2.85 pellicle is made of nitrocellulose, and has a thickness of 2.85 micrometers. Thickness variations in a single pellicle sample are less than about 0.06 microns. The Type BB-2.85 pellicle transmits 94% of incident light, on average, where the incident light is in the range of about 350 to about 450 nanometers. This pellicle absorbs and diffracts less than about 0.3% of incident light in total where the incident light is in the range of about 350 to about 450 nanometers, and shifts the focus of incident light in an optical path less than about one micron. This pellicle typically has an outside diameter of 76.2 millimeters, and an inside diameter of 72.4 millimeters. The pellicle can withstand 40 psi of air pressure from a hose having a 0.5 micrometer filter, and a 0.125 inch exit orifice provided the orifice is held at least four inches from the pellicle. The BB-2.85 pellicle is especially useful as a photomask particulate protection system for 1:1 projection aligners using high-pressure, mercury arc lamps.

The Type LR-1 pellicles are also made of nitrocellulose, and have a thickness of 0.723 plus or minus 0.01 micrometers. Minimum light transmission is about 98% at 436 nanometers and 540 nanometers; 96%, at about 365 nanometers. Incident light reflectance from these pellicles is typically about 2% at 436 and 546 nanometers and about 3% at 365 nanometers. Less than about 0.25% of the incident light is diffracted or absorbed, in total, where the incident light has a wavelength of about 436 or about 546 nanometers, and is less than about 1% in total at 365 nanometers. The Type LR-1 pellicle is strong. It will withstand 30 psi air pressure from 3-M's Model 920F airgun, provided the exit orifice is held at least four inches from the pellicle. The LR-1 shifts the focus of incident light in an optical path less than about one micron, making the LR-1 especially useful for a 10:1 direct wafer stepper such as the GCA stepper.

The new membranes are also useful as partial optical beam splitters; low-reflectance optical windows for monochromatic optical systems; partial light polarizers; acoustically-sensitive films; high-transmission windows for nuclear radiation detectors; and as anti-reflective coatings on reflective substrates having a higher index of refraction than these membranes such as bright chrome surfaces.

These membranes can be edge-supported or can be coplanar with a fully or partially-supporting surface such as a photomask, optical flat, mirror or other rigid or flexible surface.

Apparatus and methods for measuring accurately the optical thickness and index of refraction of these membranes are disclosed in the copending U.S. patent application Ser. No. 326,488 of Ray Winn and Ronald S. Hershel, entitled, "Apparatus and Methods for Measuring the Optical Thickness and Index of Refraction of Thin, Optical Membranes," and filed on the same day as this application. The text of this application, reproduced below, reads as follows:

SPECIFICATION

This invention relates to methods and apparatus for measuring accurately the optical thickness and the index of refraction of thin, optical membranes. These membranes, and the methods and apparatus for making them, are the subject of copending U.S. patent application Ser. No. 326,489, filed the same day as this application, and entitled, "Thin Optical Membranes and Methods and Apparatus for Making Such Membranes." By this reference, we incorporate the entire disclosure of that application in this application.

Our methods for measuring accurately the optical thickness and the index of refraction of a thin, optical membrane comprise directing the light onto the membrane at one or more known angles of incidence; finding at least one angle of incidence, called a null angle, where the membrane reflects substantially none of the incident light; and then calculating the optical thickness of the membrane, its index of refraction, or both, from one or more such null angles.

The light can be laser light from such sources as helium-neon lasers. Such lasers produce collimated light beams with a wavelength of about 633 nanometers. Other high or even low intensity light sources may also be used, especially where detection of the null angles is made other than by unaided eyesight. Examples include filtered mercury arc lamps, filtered incandescent lamps, and filtered xenon lamps.

Visual detection of null angles is practicable where the light source has sufficient intensity to produce a reflected light beam of visually-perceptible intensity. Helium-neon laser light, for example, produces visually-detectable reflections. Moreover, because the accuracy of null angle detection is independent of the angle of incidence, visual detection of null angles is highly reliable. Where light sources other than laser light or high-intensity light sources are used, however, the detection of null angles by means of detectors such as photomultipliers, silicon PIN diodes, and other photovoltaic detectors may be necessary.

Our method not only permits measuring the optical thickness and index of refraction of thin, optical membranes, but can be used to monitor optical thickness of thin, optical membranes as well. Thus, for example, where thin, optical membranes are intended to have an optical thickness within specified limits, our method can monitor compliance with the specifications. To do so, we determine the angle of incidence at which membranes within the specified limits produce a null angle. We then test each membrane to see whether or not it produces a null at that angle.

In one embodiment of our method, we direct a beam of collimated laser light onto a thin, optical membrane at several different known angles of incidence. Preferably, we hold the light source fixed, and rotate the membrane in the path of the light beam to change the angle of incidence. A device such as a vernier joined to the means for rotating the membranes permits measurement of the angles of incidence.

Preferably, we begin the measurement procedure at a zero angle of incidence, and then rotate the thin, optical membrane to change the angle of incidence until we find the first angle where the membrane reflects no light. For some purposes, we may need to find more than one null angle. To do so, we continue rotating the membrane until we find a second null angle.

After we find at least one null angle of incidence, we calculate the optical thickness of the membrane from the following expression (1): $Nt = k\pi/4$. In expression (1), t is the optical thickness of the membrane; $\pi$ is the wavelength of the incident light, typically measured in the same units as t; and k is the optical thickness of the membrane in units of quarter wavelengths of light. We call N the reduced index of refraction of the membrane, and calculate this reduced index of refraction from the following expression (2): $N = \sqrt{N^2 - (\sin I)^2}$, where N is the index of refraction of the membrane, and I is the null angle of incidence. To calculate optical thickness t from expression (1), we must know both N and k.

If we know the index of refraction of the membrane, but do not know k, we must find two consecutive null angles I1 and I2 for the membrane, and then compute optical thickness "t" from the following expression (3): $(N1 - N2)t = \pi/2$. N1 is computed as follows: $N1 = \sqrt{N^2 - (\sin I1)^2}$. N2 is computed as follows: $N2 = \sqrt{N^2 - (\sin I2)^2}$.

Where we do not know the membrane's index of refraction N, but do know k, we must again find two consecutive null angles I1 and I2 for the membrane, and can then compute optical thickness t from the following expression (4): $t\sqrt{(\sin I2)^2 - (\sin I1)^2} = \pi\sqrt{(K-1)}$. After calculating optical thickness "t", we can then calculate the index of refraction from expression (1). We can also calculate k from expression (4) if we know t.

The apparatus of our invention includes means for directing a light beam onto thin, optical membranes; means for varying the angle of incidence of the light beam upon the membrane; and means for detecting the angles of incidence and, in particular, the null angles.

FIG. 1 illustrates schematically one embodiment of this apparatus. In FIG. 1, helium/neon laser beam generator 1 directs a beam of collimated light 2 onto thin, optical membrane 3 at a known angle of incidence I. Rotatable fixture 4 holds membrane 3 in the path of beam 2, and permits rotation of fixture 4 and membrane 3 to a plurality of known angles of incidence. Screen 5, placed near fixture 4, has a reflective inner surface 6, which receives reflected light from membrane 3. Vernier markings on surface 6 permit detection of the angles of incidence.

Our new method and apparatus offers significant advantages over the known methods of measuring thickness of thin, optical films, namely spectrophotometry and ellipsometry. Spectrophotometry requires far more costly equipment than our methods and apparatus to measure the change in transmission or reflection of light at normal incidence as a function of the wavelength of incident light. From this change, the optical thickness at a given wavelength can be accurately measured. However, spectrophotometry does not permit measurement of the index of refraction. Ellipsometry also requires more expensive apparatus than our new apparatus, and is unreliable for measuring the thickness of unsupported, thin, optical membranes.

Our new method and apparatus are far less costly than spectrophotometers or even ellipsometers, and provide accurate measurements of the optical thickness and index of refraction of optical membranes simply, rapidly and at low cost.

The thin, optical membranes disclosed and claimed in copending U.S. patent application Ser. No. 326,489, filed the same day as this application, entitled, "Thin Optical Membranes and Methods and Apparatus for Making Such Membranes," and referred to above, have new uses not disclosed there. These membranes exhibit excellent elasticity and homogeneity. In particular, these membranes can be used to copy and reproduce large quantities of data in compressed form and with substantially no distortion, especially where these membranes are mounted on mechanically, thermally stable frames or other supports. To effect this copying, we simply form the thin, optical membranes on a surface which carries a large quantity of data in highly compressed form. Our membranes form an accurate, precise duplicate of the data from the original, and can then be utilized as an original for replication and for storage of the data.

In one embodiment, we form a thin, optical membrane on a surface carrying large quantities of data in compressed form as an embodiment on the surface. By forming the thin, optical membrane on such embossed surfaces, we replicate identically the surface embossment and the data contained in that embossment.

Our data-carrying, thin, optical membranes have a nominal thickness in the range of about 0.5 to about 10 micrometers, and exhibit edge-to-edge variations in nominal thickness of less than about 2%, and preferably about less than 1%. In any one membrane, variations in nominal thickness from edge to edge of the membrane can be limited to less than about 2%, and preferably less than about 1%. Unit-to-unit variations in nominal thickness of these membranes can be limited to less than about 2%, and preferably less than about 1%.

These membranes are highly light-transmissive. Specifically, these membranes transmit in the range of about 84% to about 99% of incident light and can be made to transmit at least about 96%, 98% or even 99% of incident light at one or more wavelengths of light in the range of about 260 to about 1,000 nanometers. Yet, these membranes shift the focus of incident light in an optical path less than about a third of the membrane's thickness. Because the membranes are highly light-transmissive, they absorb, diffract and disperse less than about 3% of incident light, and can be made to absorb, diffract and disperse less than about 1% of incident light at one or more specific wavelengths in the range of about 260 to about 1,000 nanometers (nm).

(End of reproduced specification)

The method of making our new membranes includes forming a polymer/solvent mixture, and then spin-coating a film of the polymer from the mixture onto a rotatable surface. This surface can form a coplanar support for the membrane, especially where the surface carries no parting or release agent. Where the membrane has been formed on a surface that has a release or parting agent thereon, the membrane can be joined to other support means. With the other support means joined to the membrane, the membrane can then be removed from the surface on which it was formed. For example, after a membrane has been formed on a rotatable surface having a release agent thereon, a closed perimeter ring or frame can be cemented to the membrane. After the cement cures or dries, the ring or frame can be separated from the support surface, carrying with it the membrane bonded to the ring or frame. Alternatively, the membrane can be removed from its support surface by air jets, liquid jets or other detachment means. Such membranes may then be attached to a separate ring, frame or other membrane support.

In one embodiment of our method, we dispense a polymer/solvent mixture onto a rotatable supporting surface that has a release or parting agent thereon, and then spin the surface at increasing rates of rotation until we reach a predetermined speed of rotation. Once we reach the predetermined speed of rotation, we continue to spin the rotatable surface until the membrane forms at the desired thickness and diameter. Typically, we spin the rotatable surface for a time in the range of about 3 to about 60 seconds, and at a temperature in a range of about 20° C. to about 30° C. Membrane thickness and diameter depends primarily upon the viscosities of polymer and solvent, the rate of acceleration and speed of the rotatable support on which we form the membrane, and the final speed of rotation.

As the membrane forms, solvent escapes from the polymer, and the polymer becomes more viscous, particularly near the outer edges of the forming membrane. The polymer/solvent mixture flowing toward the edges of the rotating support surface encounters higher radial acceleration in proportion to the distance from the center of rotation. Moreover, as the rotational speed of the supporting surface increases, higher radial forces are imposed on the polymer. Above the rotating support surface, we introduce a mass of solvent-rich air to reduce the rate of solvent evaporation. Variations in membrane thickness can be controlled by adjusting the rate of evaporation and the kind and quantity of thermal treatment, if any, that the membrane undergoes after formation.

To remove the finished membrane from the rotatable support surface, and, in particular, to form an edge-supported membrane therefrom, we apply cement or other bonding agent to the surface of a lapped frame. Alternatively, we can apply cement to the film itself through a stencil of appropriate shape. The frame and membrane are then joined to one another, and the cement is permitted to set and dry.

A suitable cement consists of a mixture of one-part, five-minute epoxy resin; one-part, five minute epoxy hardener; and two parts, 3-pentanone, which dilutes the epoxy and extends its pot life from a nominal three minutes to a nominal 30 minutes. After application of the epoxy/solvent mixture to the frame, the solvent evaporates quickly, causing the epoxy to cure and bond to the film.

After bonding of membrane to frame is complete, the membrane can be cut along the outside perimeter of the frame with a suitable tool, and the frame with attached membrane can then be separated from the support surface. Because of the radial stresses imposed on the membrane during spinning, and because of the reduction in volume of the membrane following evaporation of its solvent, the membrane will be taut, and will have substantially uniform tension.

The thin, optical membranes of our invention are preferably made from one or more polymers such as acrylics and nitrocellulose. In one embodiment or our invention, we dissolve nitrocellulose in a solvent such as alcohol. We could also use such solvents as ketones and polyglycols such as 1,2-dimethoxyethane. Preferably, our polymer/solvent mixture also includes a leveling agent such as General Electric's Type SF-69 silicone fluid. In our polymer/solvent mixtures, the polymer can constitute from about 5% to about 30% by weight; the solvent, from about 70% to about 95% by weight; and the leveling agent, from about 0.001% to about 0.01% by weight. As the ratio of solvent to polymer increases, the thickness of the membrane formed from such mixtures, in general, decreases.

Suitable release or parting agents for coating the rotatable surface in our method include Hunt Chemical Company's Superslix I. We can apply the release or parting agent to the rotatable surface by such conventional methods as spinning, dipping or brushing. Some release and some parting agents must also be cured at temperatures above room temperature to be effective.

Apparatus for making our new, thin, optical membranes includes means for dispensing a mixture of polymer and solvent onto a rotatable supporting surface; means for rotating the supporting surface at increasing velocities from a first speed to a final speed; and means for removing the film from the supporting surfaces as an edge-supported or coplanar-supported membrane.

DETAILED DESCRIPTION

Figure 1:
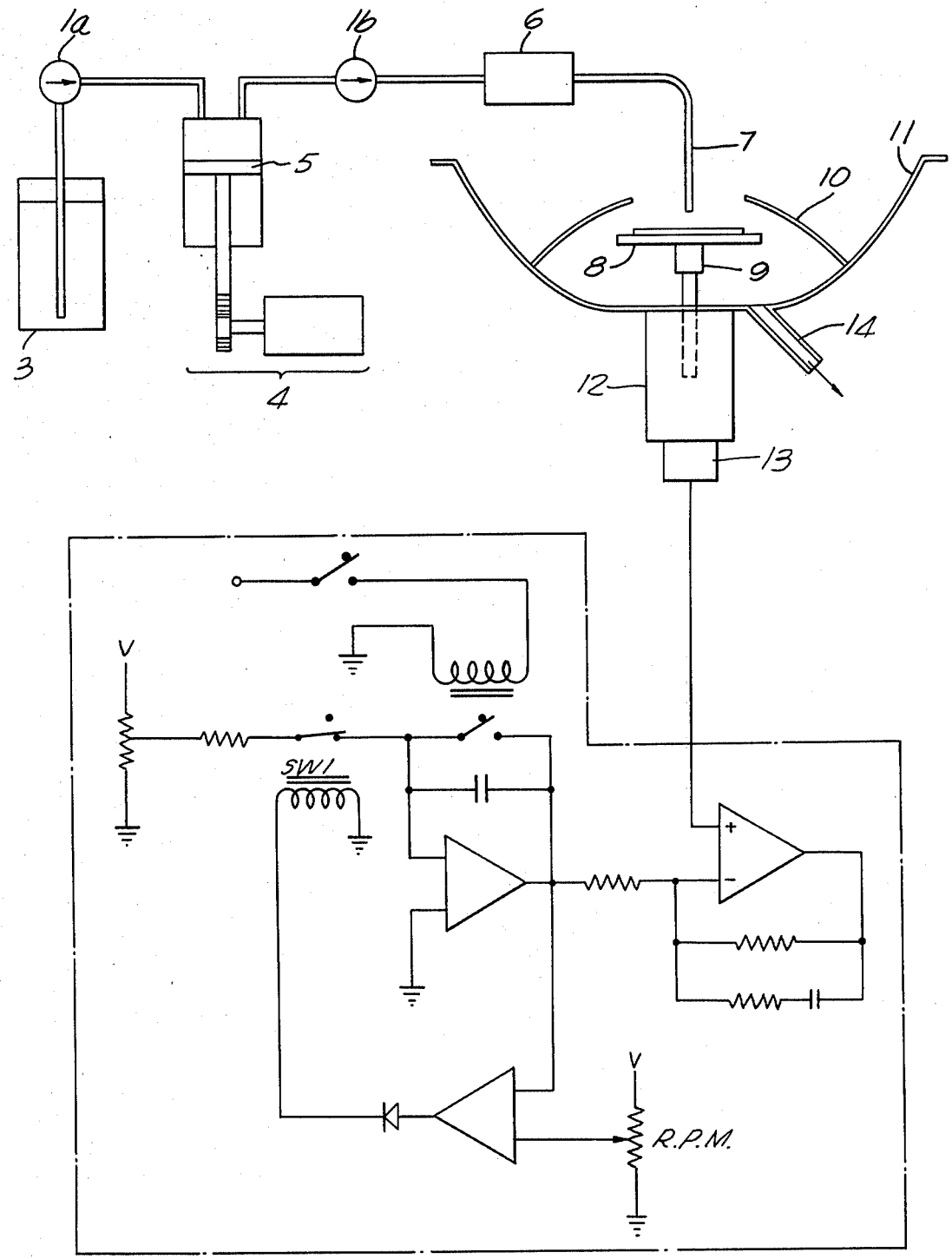
FIG. 1 accompanying this specification illustrates a preferred embodiment of my new apparatus.

In FIG. 1, a polymer/solvent mixture in container 3 is pumped through check valves 1a and 1b by pump 5. Motor means/gear-drive linkage 4 drives the piston in pump 5. The polymer/solvent mixture passes through filter 6 and dispensing means 7 onto rotatable supporting surface 8.

Motor 12 spins chuck 9 and surface 8 in a controlled manner beginning at a predetermined velocity, and accelerating to a second, higher predetermined velocity, then holding that second velocity until the desired membrane forms. During rotation, splash guard/wind shroud means 10 minimizes the tendency of solvent and polymer to escape from the spinner bowl means 11. Drain means 14 provides an exit for unused polymer and solvent. Tachometer 13 is linked to motor 12 on one side and to a suitable servo system on the other side.

The servo system initiates rotation of surface 8, and accelerates the velocity of rotation from the start, preferably linearly, at an acceleration in the range of about 50 rpm to about 500 rpm per second to a final velocity in the range of about 500 rpm to about 2,500 rpm.

Supporting surface 8 can be a round, square or rectangular, rigid or semi-rigid, optically-polished surface. Supporting surfaces made of metal, glass, and metal film on glass quartz are examples of suitable support surfaces. The surface quality of the support determines the quality of the membrane surface formed thereon.

What is claimed is:

1. An optical membrane capable of being edge-supported and having a predetermined thickness in the range of about 0.5 to about 10 micrometers, with a precision of plus or minus about 2%, edge-to-edge variations in said thickness of less than about 2% over a distance of at least about 2.5 centimeters, and a capacity to transmit an average of at least about 91% of incident light with less than about 2% combined absorption and diffraction losses of said incident light over a span of wavelengths of incident light in the range of about 260 to about 1,000 nanometers.

2. An optical membrane capable of being edge-supported and having a precise, predetermined thickness in the range of about 0.5 to about 10 micrometers, the precision being plus or minus about 2%, edge-to-edge variations in said thickness of less than about 2% over a distance of at least about 2.5 centimeters, and a capacity to transmit an average of at least about 91% of incident light over a span of wavelengths of incident light where the span of wavelengths of said incident light is in the range of about 260 to 1,000 nanometers.

3. An optical membrane capable of being edge-supported and having a precise, predetermined thickness in the range of about 0.5 to about 10 micrometers, the precision being plus or minus about 2%, and a capacity to transmit an average of at least about 91% of incident light with less than about 3% combined absorption, diffraction and dispersion losses of said incident light where the wavelength span for the average transmission of incident light is in the range of about 260 to about 1,000 nanometers.

4. An optical membrane capable of being edge-supported and having a predetermined, precise thickness in the range of about 0.5 to about 10 micrometers, the precision being plus or minus about 2%, and the capacity to transmit an average of at least about 91% of incident light where the wavelengths of incident light range from about 260 to about 546 nanometers.

5. An optical membrane capable of being edge-supported and having a predetermined, precise thickness in the range of about 0.5 to about 10 micrometers, the precision being plus or minus about 2%, edge-to-edge variations in said thickness of less than about 2% over a distance of at least about 2.5 centimeters, and the capacity to transmit about 99% of incident light at at least one predetermined wavelength of incident light in the range of about 260 to about 1,000 nanometers.

6. An optical membrane capable of being edge-supported and having a precise, predetermined thickness in the range of about 0.5 to about 10 micrometers with a precision of plus or minus about 2%, edge-to-edge variations in said thickness of less than about 2% over a distance of at least about 2.5 centimeters, and the capacity to transmit about 99% of incident light at at least one predetermined wavelength of incident light in the range of about 260 to about 546 nanometers.

7. The optical membrane of claim 1 or claim 2 or claim 3 or claim 4 or claim 5 or claim 6 wherein the optical membrane is made of a polymer.

8. The optical membrane of claim 1 or claim 2 or claim 3 or claim 4 or claim 5 or claim 6 wherein the optical membrane is made of a thermoplastic polymer.

9. The optical membrane of claim 1 or claim 2 or claim 3 or claim 4 or claim 5 or claim 6 wherein the optical membrane is made of nitrocellulose.

10. The membrane of claim 1 or claim 2 or claim 3 or claim 4 or claim 5 or claim 6 wherein said membrane is edge-supported.

11. The membrane of claim 1 or claim 2 or claim 3 or claim 4 or claim 5 or claim 6 wherein said membrane is carried upon a coplanar substrate.

12. The membrane defined in claim 1 or claim 2 or claim 3 or claim 4 or claim 5 or claim 6 wherein said membrane is carried upon a support.

13. The optical membrane of claim 1 or claim 2 or claim 3 or claim 4 or claim 5 or claim 6 wherein said membrane is a pellicle.

14. The optical membrane of claim 1 or claim 2 or claim 3 or claim 4 or claim 5 or claim 6 made by dispensing a polymer/solvent mixture onto a rotatable supporting surface, and spinning said rotatable surface under conditions sufficient to form said membrane from said polymer.

15. The membrane of claim 1 or claim 2 or claim 3 or claim 4 or claim 5 or claim 6 and made by dispensing a polymer/solvent mixture onto a rotatable supporting surface, spinning said rotatable surface under conditions sufficient to form said membrane from said polymer, and removing said membrane after formation from said rotatable supporting surface.

16. The membrane of claim 1 or claim 2 or claim 3 or claim 4 or claim 5 or claim 6 made by dispensing a polymer/solvent mixture onto a rotatable supporting surface, spinning said rotatable surface under conditions sufficient to form said membrane from said polymer, bonding said membrane formed on said rotatable supporting surface to support means for said membrane, and removing said membrane from said rotatable supporting surface, joined to said support means.

17. An optical membrane capable of being edge-supported and having a precise, predetermined thickness in the range of about 0.5 to about 10 micrometers, the precision being plus or minus about 2%, with edge-to-edge variations in said thickness of less than about 2% over a distance of at least about 2.5 centimeters, said membrane being made by dispensing a polymer/solvent mixture onto a rotatable supporting surface, and spinning said rotatable surface under conditions sufficient to form said membrane from said polymer.

18. The optical membrane of claim 17 wherein the method of making said membrane further comprises bonding the membrane formed on said rotatable supporting surface to support means therefor, and removing said membrane from said rotatable supporting surface, joined to said support means.

19. The optical membrane of claim 18 wherein said support means provides edge suppport for said membrane.

20. The optical membrane of claim 18 wherein said support means provides edge support for said membrane.

21. The optical membrane of claim 17 wherein the method of making said membrane further comprises bonding the membrane formed on said rotatable supporting surface to support means therefor, and removing said membrane from said rotatable supporting surface, joined to said support means.

22. An optical membrane capable of being edge-supported and having a predetermined, precise thickness in the range of about 0.5 to about 10 micrometers, with edge-to-edge variations in said thickness of less than about 2% over a distance of at least about 2.5 centimeters, and a capacity to transmit an average of at least about 91% of incident light over a span of wavelengths of incident light in the range of about 260 to about 1,000 nanometers, said membrane being made by dispensing a polymer/solvent mixture onto a rotatable supporting surface, and spinning said rotatable surface under conditions sufficient to form said membrane from said polymer.

23. The optical membrane of claim 22 wherein the method of making said membrane further comprises bonding the membrane formed on said rotatable supporting surface to support means therefor, and removing said membrane from said rotatable supporting surface, joined to said support means.

24. The optical membrane of claim 22 wherein said support means provides edge support for said membrane.

25. An optical membrane capable of being edge-supported, and having a predetermined, precise thickness in the range of about 0.5 to about 10 micrometers with edge-to-edge variations in said thickness of less than about 2% over a distance of at least about 2.5 centimeters, said membrane having the capacity to transmit about 99% of incident light at at least one predetermined wavelength of light in the range of about 260 to about 1,000 nanometers, said membrane being made by a process comprising dispensing a polymer/solvent mixture onto a rotatable supporting surface, and spinning said rotatable supporting surface under conditions sufficient to form said membrane from said polymer.

26. An optical membrane capable of being edge-supported, and having a predetermined, precise thickness in the range of about 0.5 to about 10 micrometers, the precision being plus or minus about 2%, edge-to-edge variations in said thickness of less than about 2% over a distance of at least about 2.5 centimeters, said membrane being a pellicle with a capacity to transmit an average of at least about 91% of incident light where the incident light wavelengths range from about 260 nanometers to about 450 nanometers.

27. The membrane of claim 26, said membrane being made by a process comprising dispensing a polymer/solvent mixture onto a rotatable supporting surface, and spinning said rotatable surface under conditions sufficient to form said membrane from said polymer.

28. The membrane of claim 27 wherein the method of making said membrane further comprises bonding said membrane on said rotatable supporting surface to support means for said membrane, and removing said membrane from said rotatable supporting surface, joined to said support means.

29. The optical membrane of claim 28 wherein said support means provides edge support for said membrane.

30. An optical membrane capable of being edge-supported and having a predetermined, precise thickness in the range of about 0.5 to about 10 micrometers, the precision being plus or minus about 2% said membrane being made by a process comprising dispensing a polymer/solvent mixture onto a rotatable supporting surface, and spinning said rotatable surface under conditions sufficient to form said membrane from said polymer.

31. The optical membrane of claim 30 wherein the method of making said membrane further comprises bonding said membrane on said rotatable supporting surface of support means for said membrane, and removing said membrane from said rotatable supporting surface, joined to said support means.

32. The optical membrane of claim 30 wherein said support means provides edge support for said membrane.

33. An optical membrane, capable of being edge-supported, and having a precise, predetermined thickness in the range of about 0.5 to about 10 micrometers, the precision being plus or minus about 2%, edge to edge variations in said thickness of less than about 2% over a distance of at least about 2.5 centimeters and a capacity to transmit at least one predetermined percentage of incident light in the range of about 96% to about 99% of incident light over a range of wavelengths of incident light in the range of about 260 to about 1,000 nanometers.

34. The optical membrane of claim 33, said membrane being made by dispensing a polymer/solvent mixture onto a rotatable supporting surface, and spinning said rotatable supporting surface under conditions sufficient to form said membrane from said polymer.

35. The optical membrane of claim 33 wherein the method of making said membrane further comprises bonding said membrane formed on said rotatable supporting surface to support means for said membrane, and removing said membrane from said rotatable supporting surface, joined to said support means.

36. The optical membrane of claim 35 wherein said support means provides edge support for said membrane.

37. The optical membrane of claim 17 or claim 18 or claim 22 or claim 23 or claim 25 or claim 21 or claim 28 or claim 31 or claim 34 or claim 35 wherein said rotatable supporting surface has a release agent thereon.

* * * * *